US012621525B2

(12) United States Patent
Emmanuel

(10) Patent No.: US 12,621,525 B2
(45) Date of Patent: \*May 5, 2026

(54) GESTURE-BASED PARENTAL CONTROL SYSTEM

(71) Applicant: Adeia Guides Inc., San Jose, CA (US)

(72) Inventor: Daina Emmanuel, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 18/779,720

(22) Filed: Jul. 22, 2024

(65) Prior Publication Data

US 2024/0380943 A1 Nov. 14, 2024

Related U.S. Application Data

(63) Continuation of application No. 17/362,484, filed on Jun. 29, 2021, now Pat. No. 12,075,122.

(51) Int. Cl.
*H04N 21/454* (2011.01)
*G06F 3/01* (2006.01)

(52) U.S. Cl.
CPC ......... *H04N 21/4542* (2013.01); *G06F 3/017* (2013.01)

(58) Field of Classification Search
CPC ............................. H04N 21/4542; G06F 3/017
See application file for complete search history.

(56) References Cited

U.S. PATENT DOCUMENTS

| | | | |
|---|---|---|---|
| 7,761,892 B2 | 7/2010 | Ellis et al. | |
| 11,019,191 B1 | 5/2021 | Gorsica et al. | |
| 12,075,122 B2 | 8/2024 | Emmanuel | |
| 2005/0086069 A1 | 4/2005 | Watson et al. | |
| 2015/0070516 A1* | 3/2015 | Shoemake | H04N 21/4542 |
| | | | 348/207.11 |
| 2018/0288478 A1 | 10/2018 | Durham et al. | |
| 2018/0310042 A1* | 10/2018 | Mayalil | H04N 21/41407 |
| 2020/0275158 A1* | 8/2020 | Gaur | H04N 21/251 |
| 2022/0417600 A1 | 12/2022 | Emmanuel | |

FOREIGN PATENT DOCUMENTS

| | | | |
|---|---|---|---|
| WO | 2004064377 A2 | 7/2004 | |
| WO | WO-2015012500 A1 * | 1/2015 | G06F 3/005 |

* cited by examiner

*Primary Examiner* — Sumaiya A Chowdhury
(74) *Attorney, Agent, or Firm* — HG LAW LLP

(57) ABSTRACT

Systems and methods for presenting user-selectable options for parental control in response to detecting a triggering action by a user are disclosed. A system generates for output a first content item on a device. The system identifies a first user and a second user in proximity to the device and determines that a first gesture is performed by the first user wherein the first gesture is covering the eyes of the second user. In response to determining that the first gesture is performed, the system presents a selectable option for a user input such as (a) skipping a portion of the first content item; (b) lowering the volume; (c) removing the video of the first content item; or (d) presenting a second content item instead of presenting the first content item. In response to receiving a user input selecting the selectable option, the system performs an action corresponding to the selectable option.

20 Claims, 8 Drawing Sheets

100

100

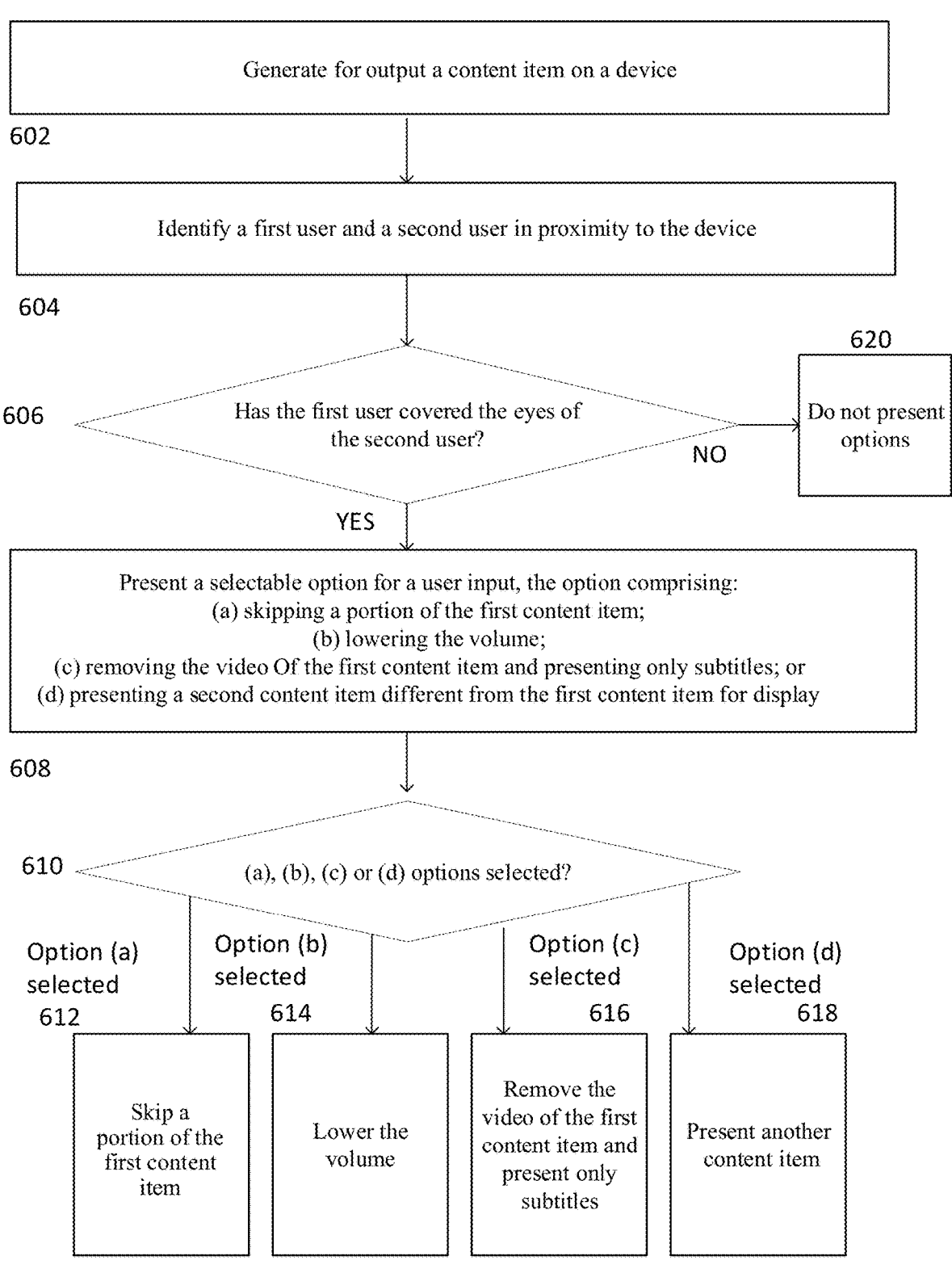
FIG. 6     600

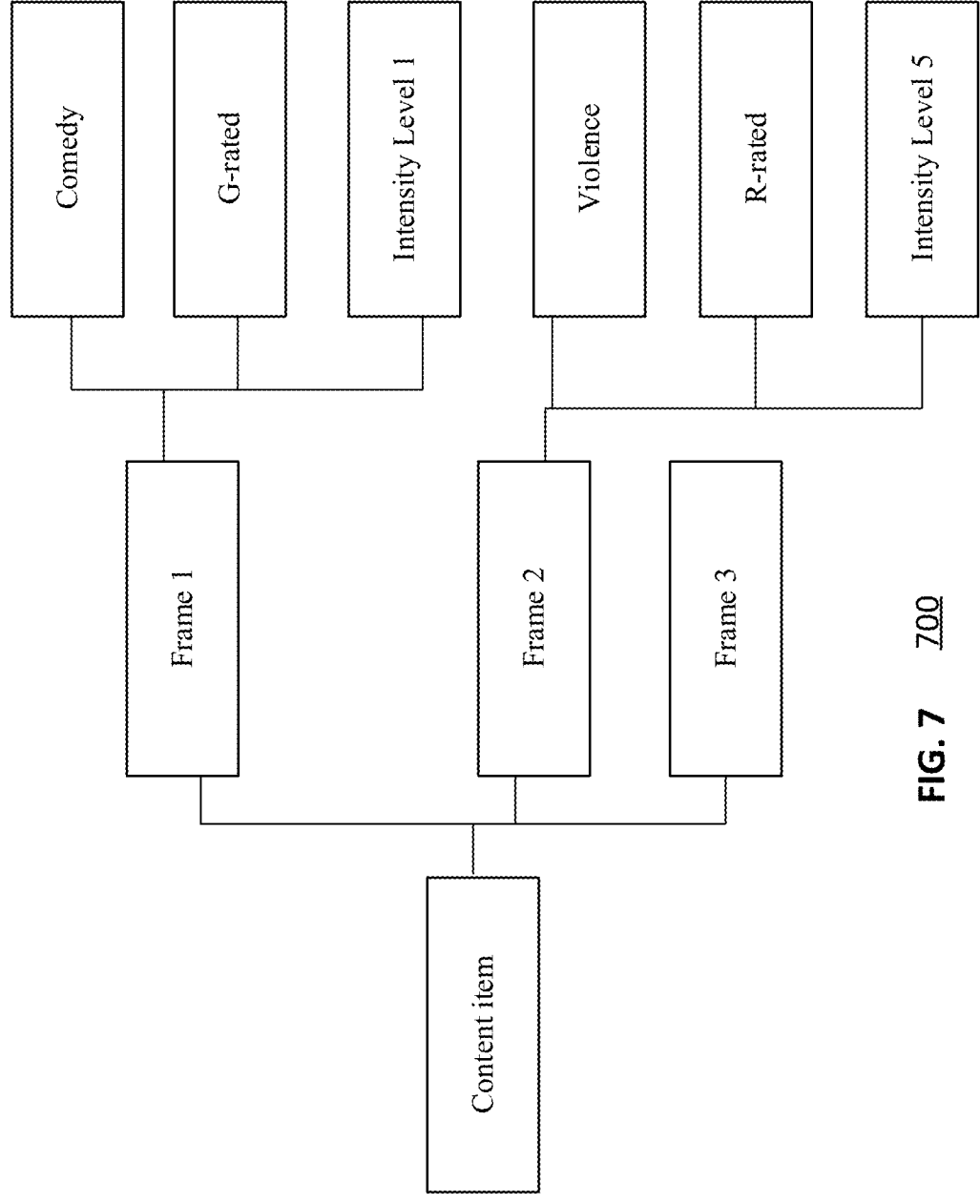
FIG. 7     700

GESTURE-BASED PARENTAL CONTROL SYSTEM

CROSS-REFERENCE TO RELATED APPLICATION

This application is a continuation of U.S. patent application Ser. No. 17/362,484, filed Jun. 29, 2021, which is hereby incorporated by reference herein in its entirety.

BACKGROUND

With the rapid development of media technology, numerous content items are available from a variety of sources to media consumers. However, there may be some content items that the parents may deem inappropriate for their child based on the child's age or maturity level.

To address this issue, in one existing approach, content items are rated based on parental guidelines set by the industry and organizations (e.g., PG-13). Content items with certain ratings, such as R-rated content items, may be restricted to minor viewers. This approach is deficient because a local standard may not be applied throughout all of the content items that can be accessed from a variety of sources (e.g., international content), and the parents may have their own standards different from the parental guidelines set by the industry. This may require additional attention for the parents to control and restrict the access of the content items that otherwise may be accidentally viewed by their child.

SUMMARY

To overcome such deficiencies, methods and systems are described herein for detecting a user gesture that indicates the user's intent in restricting access to inappropriate content (e.g., censored content) by minor viewers. For example, a system receives a request to present a content item for display on a device. The system may use one or more sensors implemented on the device to determine the presence of one or more users that are in the vicinity of the device. For instance, the device may use a camera to detect that a user who is within a threshold distance from the device (e.g., TV) or may use a speaker to identify a user who is having a conversation with another user near the device while the content item is output for display.

Based on the detection, the system determines that at least one user is watching the content item and retrieves user age information from user profile data. The system may store user profiles that are associated with the device or access the user profiles that are stored remotely. For example, the system may use user credentials or user data that have been received (e.g., parents setting the parental control for a child). From the user profile data, the system may determine the age of the user who is engaged with the device and who is performing the user gesture. The system also may determine the user's age based on the visual features of the user received from the sensors implemented on the device using one or more age-profiling techniques.

While the family is watching the content item, if a first user (e.g., mother) performs a specific action, such as covering the eyes of another user (e.g., child) for a predetermined time period, then the system determines that the content item includes content that is inappropriate for the minor user. Any material that is harmful, violent, sensitive, or objectionable may be deemed inappropriate for users under a certain age. The parents may put their hands over the child's eyes to ensure that the child does not watch the violent portion of the content item. In some embodiments, the parents may cover their own eyes with their hands (self-blocking) or the minor users may cover their eyes with their hands if startling content is being displayed. Any of these actions may trigger temporary content restriction. Although the above-listed actions are used as exemplary triggering actions, any user-defined or system-defined gesture may be used to trigger content restriction.

When such an action is performed by the user, the system analyzes the user gesture using one or more gesture detection algorithms and determines that the performed gesture triggers temporary restriction of the content item. In response to determining that the triggering gesture is performed, the system may present user-selectable options for display. The user-selectable options include: (a) skipping a portion of the content item; (b) lowering the volume; (c) removing the video of the content item and presenting only subtitles associated with the content item; or (d) presenting another content item. The list is not an exclusive list; there may be other options that can obstruct the presentation of a portion of the content item. When a user selects one of the selectable options, the system performs an action corresponding to the selection.

For example, if option (a) is selected, then the system skips a portion of the content item such that a segment that is deemed inappropriate is entirely skipped, and a subsequent segment of the content item is presented for display. In some embodiments, a segment that is deemed inappropriate is fast-forwarded at a predetermined speed. A skipping amount may be selected by the user. In one embodiment, a skipping amount may be determined by the system based on the metadata of the content item. Once the portion of the content item that is deemed inappropriate is passed, the rest of the content item may be played at a normal speed.

If option (b) is selected, then the volume of the content item is lowered, so the minor user does not hear the audio of the content item while the video of the content item is presented for display. For example, if swear words were used in the content item and the parent user does not want the minor user to listen to the swear words, then option (b) may be selected. Because only the audio is suppressed, the video of the content item is still presented for display. Once the portion that is deemed inappropriate is passed, the volume of the content item is increased back to a previously set level.

If option (c) is selected, then the system removes the video of the content item and presents only the subtitles associated with the content item. For example, if the content includes brutal scenes that the parent user does not want the minor user to watch, then option (c) may be selected. When option (c) is selected, the entirety of the video may be removed such that a blank frame may appear. The blank frame may include a warning sign indicating that the content is being restricted. In some embodiments, only a portion of a frame that is deemed inappropriate may be removed (e.g., certain portions of the frame that includes blood). Any content manipulation techniques, such as blurring, masking, or pixelating, may be used. If the content item does not have subtitles, then the system removes the video of the content item without showing any subtitles.

If option (d) is selected, then the system presents another content item instead of presenting the currently displayed content item. The system identifies a set of candidate content items that have similar attributes to the currently displayed content item based on metadata of the content item. For example, if a user is watching a romance movie, then another romance movie that is in the same genre as the currently displayed content item may be selected based on comparing the metadata of the currently displayed content item and the alternative content item. In some embodiments, a content item is selected based on the user profile data. For example, if a user indicates preferences for certain actors, then a content item starring a preferred actor may be selected based on the user profile data. An alternative content item may include content that is suitable for a general audience (e.g., family movie).

In some embodiments, the system stores options previously selected by the user as user preference data in a database and displays a pop-up message identifying the previously selected options via a graphical user interface. For example, upon detecting the user gesture, the system may present a pop-up message prompting the user to select a previously selected option. For example, the pop-up message may include, "You previously lowered the volume: do you want to enable this option?"

In some embodiments, the system determines whether a segment contains inappropriate content based on the metadata of the content item. The metadata of the content item includes certain information about each segment of the content item, such as genre information (e.g., action), parental guidance ratings (e.g., PG-13), and intensity level (e.g., intensity level 5). Each piece of information may be stored in the metadata in the form of tags. The metadata may be provided by a content item provider and may be retrieved from a remote source. For example, the genre information and the parental guidance rating may already be determined by the content provider and included in the metadata.

An intensity level is a learned user-specific score based on user behavior. An intensity level represents a personalized rating that is calculated based on the user interaction with the content items. In some embodiments, an intensity level may not be consistent with the parental guidance ratings. To calculate an intensity level for each segment, the system may use one or more machine learning algorithms. The system monitors user viewing history and identifies at which point the triggering action was performed. An intensity level may be trained based on previous user interactions with various content items and updated in real time. Based on the viewing history and timing information, the system calculates an intensity level for each segment.

When the user performs the triggering action, the system identifies a segment at which the triggering action is performed and generates a metadata tag for the identified segment. This metadata tag may be used to inform other users of the potentially inappropriate segment when the same content item is consumed. For example, user A may be watching a content item. Before presenting an inappropriate segment and without detecting a triggering action by user A, the system displays a pop-up message "Other users have lowered the volume when they were watching the upcoming segment. Do you also want to lower the volume?" An option identified in the message may be presented with the pop-up message (e.g., lowering the volume). This way, the user can completely restrict the inappropriate content viewable by the minor user even before the inappropriate content is being generated for display.

The present disclosure addresses the problem of accidental viewing of inappropriate content by minor users, for example, by detecting user actions that trigger user-selectable options that enable temporary restriction of the content item. The present disclosure saves the network bandwidth and reduces network traffic by not sending inappropriate segments or video content of the content item for the purpose of content filtering.

It should be noted that the systems, methods, apparatuses, and/or aspects described above may be applied to, or used in accordance with, other systems, methods, apparatuses, and/or aspects described in this disclosure.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 depicts a flowchart of a process for providing user-selectable options for gesture-based parental control of content items, in accordance with some embodiments of the disclosure; and FIG. 7 depicts exemplary metadata associated with a content item, in accordance with some embodiments of the disclosure.

DETAILED DESCRIPTION

Figure 1:
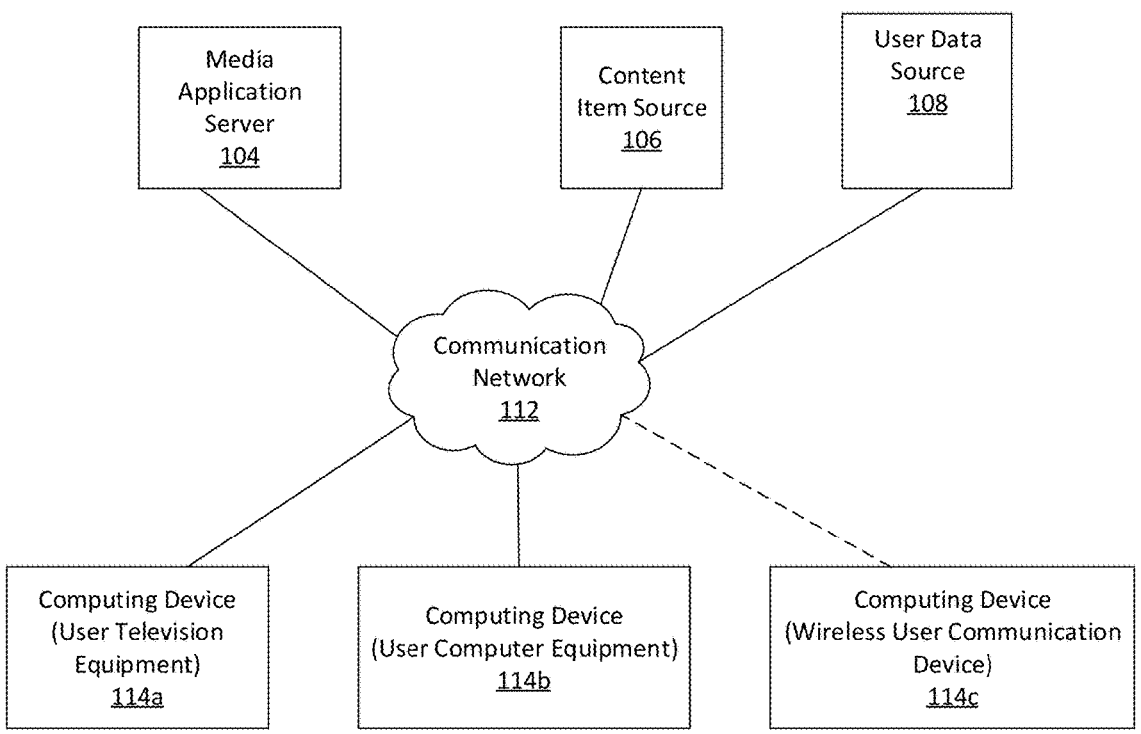
FIG. 1 depicts an illustrative block diagram of a gesture-controlled parental control system, in accordance with some embodiments of the disclosure.

FIG. 1 shows an illustrative block diagram of a gesture-controlled parental control system, in accordance with some embodiments of the disclosure. In one aspect, system 100 includes one or more of media application server 104, content item source 106, user data source 108, and communication network 112.

Communication network 112 may be one or more networks including the Internet, a mobile phone network, mobile voice or data network (e.g., a 4G or LTE network), cable network, public switched telephone network, or other types of communication network or combinations of communication networks. Communication network 112 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 112 communicatively couples various components of system 100 to one another. For instance, server 104 may be communicatively coupled to a video-hosting web server (not shown), content item source 106, and/or user data source 108 via communication network 112.

A video-hosting web server hosts one or more video websites, such as YouTube™, and/or the like, that enable users to download or stream videos, video clips, and/or other types of content. In addition to enabling users to download and view content, the video websites also provide access to data regarding downloaded content.

Content item source 106 may store content item-related data from one or more types of content providers or originators of content (e.g., a television broadcaster, Webcast provider, on-demand content provider, over-the-top content providers, or other providers of content). Content item source 106 includes a content item, metadata associated with the content item, manifest associated with the content item, or any other related material associated with the content item. The manifest or metadata of the content item may include, among other information about the content item, such as genre information, intensity level, or parental guidance rating for each segment of the content item. A remote media server may be used to store different types of content in a location remote from computing device 114 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

User data source 108 may provide user-related data, such as user profile or preference data described herein such as preferred selection options, previous option selection, preferred content item, preferred characters or actors, to any of computing devices 114, server 104 and/or video-hosting web server using any suitable approach. In some embodiments, content item source 106 and user data source 108 may be integrated as one device.

In some embodiments, content item data from content item source 106 may be provided to computing devices 114 using a client/server approach. For example, computing device 114 may pull content item data from a server (e.g., server 104), or a server may push content item data to computing device 114. In some embodiments, a client application residing on computing device 114 may initiate sessions with user data source 108 to obtain content item data when needed, e.g., when the content item data is out of date or when computing device 114 receives a request from the user to receive data.

Content and/or content item data delivered to computing device 114 may be over-the-top (OTT) content. OTT content delivery allows Internet-enabled user devices, such as computing device 114, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YouTube™ or Netflix™ which provide audio and video via IP packets. YouTube™ is a trademark owned by Google Inc. and Netflix™ is a trademark owned by Netflix Inc. OTT content providers may additionally or alternatively provide content item data described above. In addition to content and/or content item data, providers of OTT content can distribute applications (e.g., web-based applications or cloud-based applications), or the content can be displayed by applications stored on computing device 114.

As described in further detail below, server 104 accesses the content of the video website(s) hosted by a video-hosting web server and, based on the accessed content, generates a variety of types of data such as metadata or manifest (e.g., terms, associations between terms and corresponding media content identifiers, genre information, parental guidance ratings, intensity level for each segment of the content item, and/or the like) that can be accessed to facilitate the retrieving or searching of media content made available by content item source 106. In some embodiments, server 104 accesses a manifest or metadata of the content item from content item source 106. The manifest of the content item may be generated by a video-hosting web server or server 104. In some embodiments, the manifest of the content item may be generated by a third-party generator that has access to the content item.

System 100 also includes one or more computing devices 114, such as user television equipment 114*a* (e.g., a set-top box), user computer equipment 114*b*, and wireless user communication device 114*c* (e.g., a smartphone device or a remote control), which users can use to interact with server 104, user data source 108, and/or content item source 106, via communication network 112, to search for desired media content. For instance, in some aspects, server 104 may provide a user interface via computing device 114, by which a user can input a query for a particular item of media content made available by content item source 106, and generate a response to the query by accessing and/or processing data and/or metadata. Although FIG. 1 shows one of each component, in various examples, system 100 may include multiples of one or more illustrated components. For instance, system 100 may include multiple video-hosting web servers, and server 104 may aggregate data from the multiple video websites hosted by multiple video-hosting web servers, respectively.

Figure 2:
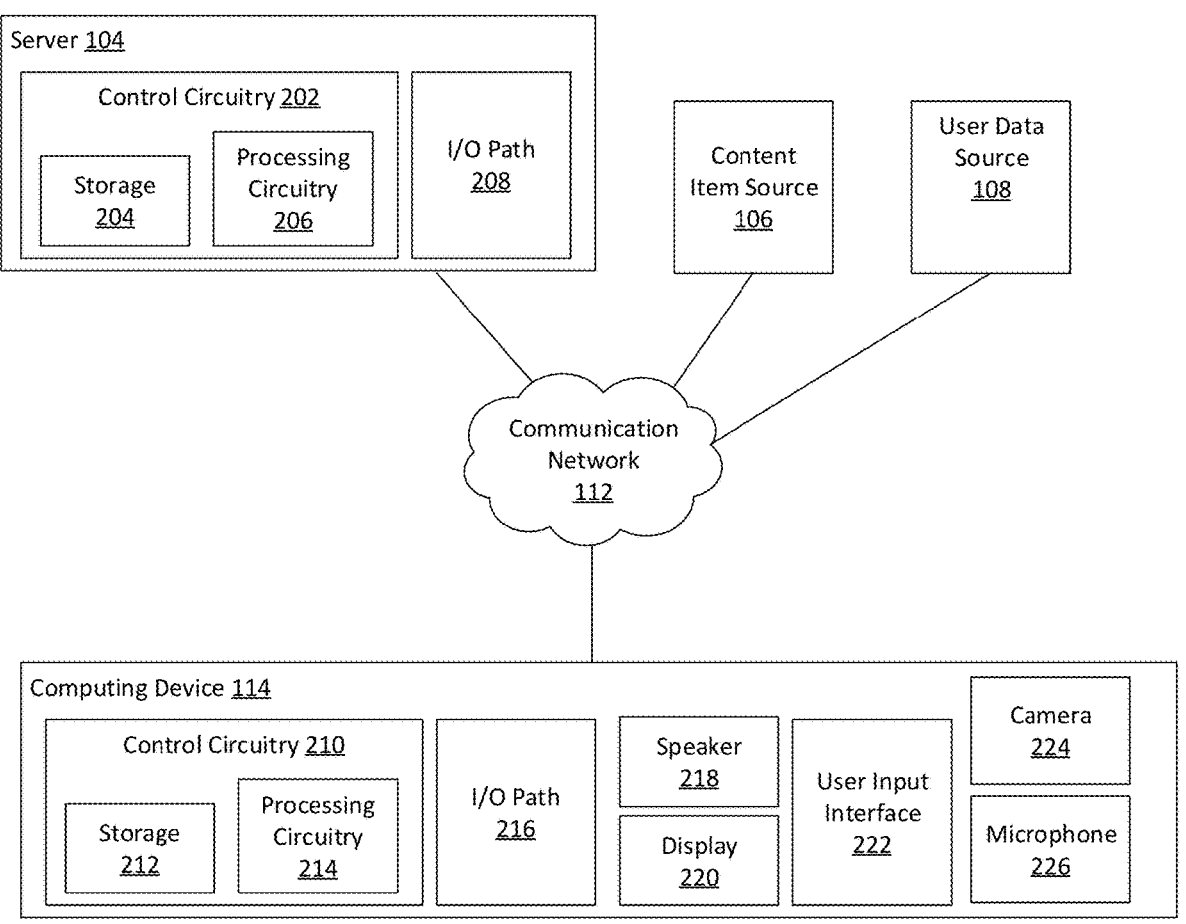
FIG. 2 depicts an illustrative block diagram showing additional details of the system of FIG. 1, in accordance with some embodiments of the disclosure.

FIG. 2 is an illustrative block diagram showing additional details of the system 100 of FIG. 1, in accordance with some embodiments of the disclosure. In particular, server 104 includes control circuitry 202 and input/output (I/O) path 208, and control circuitry 202 includes storage 204 and processing circuitry 206. Computing device 114 includes control circuitry 210, I/O path 216, speaker 218, display 220, camera 224, microphone 226, and user input interface 222. Control circuitry 210 includes storage 212 and processing circuitry 214. Control circuitry 202 and/or 210 may be based on any suitable processing circuitry such as processing circuitry 206 and/or 214 respectively.

As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 100 (e.g., storage of content item source 106, user data source 108, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Each of storage 204, storage 212, and/or storages of other components of system 100 may be used to store various types of content, content item data, and or other types of data. Non-volatile memory may also be used (e.g., to launch a bootup routine and other instructions). Cloud-based storage may be used to supplement storages 204, 212 or instead of storages 204, 212.

In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 204 and/or 212 and executed by control circuitry 202 and/or 210. In some embodiments, the application may be a client/server application where only a client application resides on computing device 114, and a server application resides on server 104.

The application (e.g., media application) may be implemented using any suitable architecture. For example, it may be a stand-alone application wholly implemented on computing device 114. For example, the media application may be implemented as software or a set of executable instructions, which may be stored in non-transitory storage 212 and executed by control circuitry 210 of a user device 114. In such an approach, instructions for the application are stored locally (e.g., in storage 212), and data for use by the application is downloaded on a periodic basis (e.g., from an out-of-band feed, from an Internet resource, or using another suitable approach). Control circuitry 210 may retrieve instructions for the application from storage 212 and process the instructions to perform the functionality described herein. Based on the processed instructions, control circuitry 210 may determine what action to perform when input is received from user input interface 222.

In client/server-based embodiments, control circuitry 210 may include communication circuitry suitable for communicating with an application server (e.g., server 104) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 112).

In another example of a client/server-based application, control circuitry 210 runs a web browser that interprets web pages provided by a remote server (e.g., server 104). For example, the remote server may store the instructions for the application in a storage device. The remote server may process the stored instructions using circuitry (e.g., control circuitry 202) and generate the displays discussed above and below. Computing device 114 may receive the displays generated by the remote server and may display the content of the displays locally via display 220. This way, the processing of the instructions is performed remotely (e.g., by server 104) while the resulting displays are provided locally on computing device 114. Computing device 114 may receive inputs from the user via input interface 222 and transmit those inputs to the remote server for processing and generating the corresponding displays.

A user may send instructions to control circuitry 202 and/or 210 using user input interface 222. User input interface 222 may be any suitable user interface, such as a remote control, trackball, keypad, keyboard, touchscreen, touchpad, stylus input, joystick, voice recognition interface, or other user input interfaces. User input interface 222 may be integrated with or combined with display 220, which may be a monitor, a television, a liquid crystal display (LCD), electronic ink display, or any other equipment suitable for displaying visual images.

Camera 224 of computing device 114 may capture an image or a video. The image or video may be used in connection with gesture detection algorithms to analyze a gesture or action performed by the user. The image or video may be used in connection with a face detection algorithm to identify a user or determine an age of the user. A microphone 226 of computing device 114 may detect sound in proximity to computing device 114 and converts the sound to electrical signals.

Server 104 and computing device 114 may receive content and data via I/O paths 208 and 216, respectively. I/O paths 208, 216 may provide content (e.g., broadcast programming, on-demand programming, Internet content, content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Figure 3:
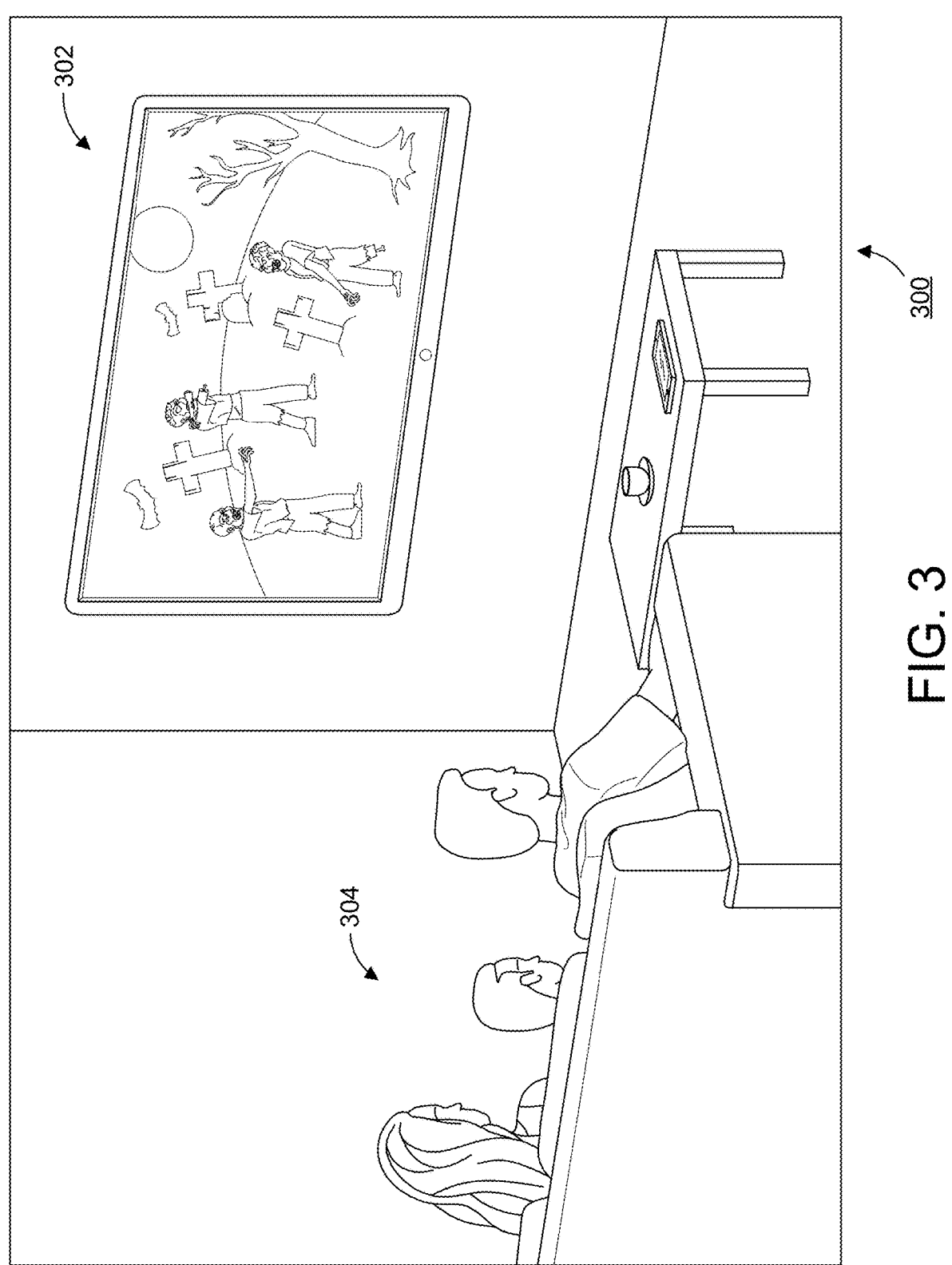
FIG. 3 depicts an exemplary user interface of presenting violent content for display on the illustrative device, in accordance with some embodiments of the disclosure.
Figure 4:
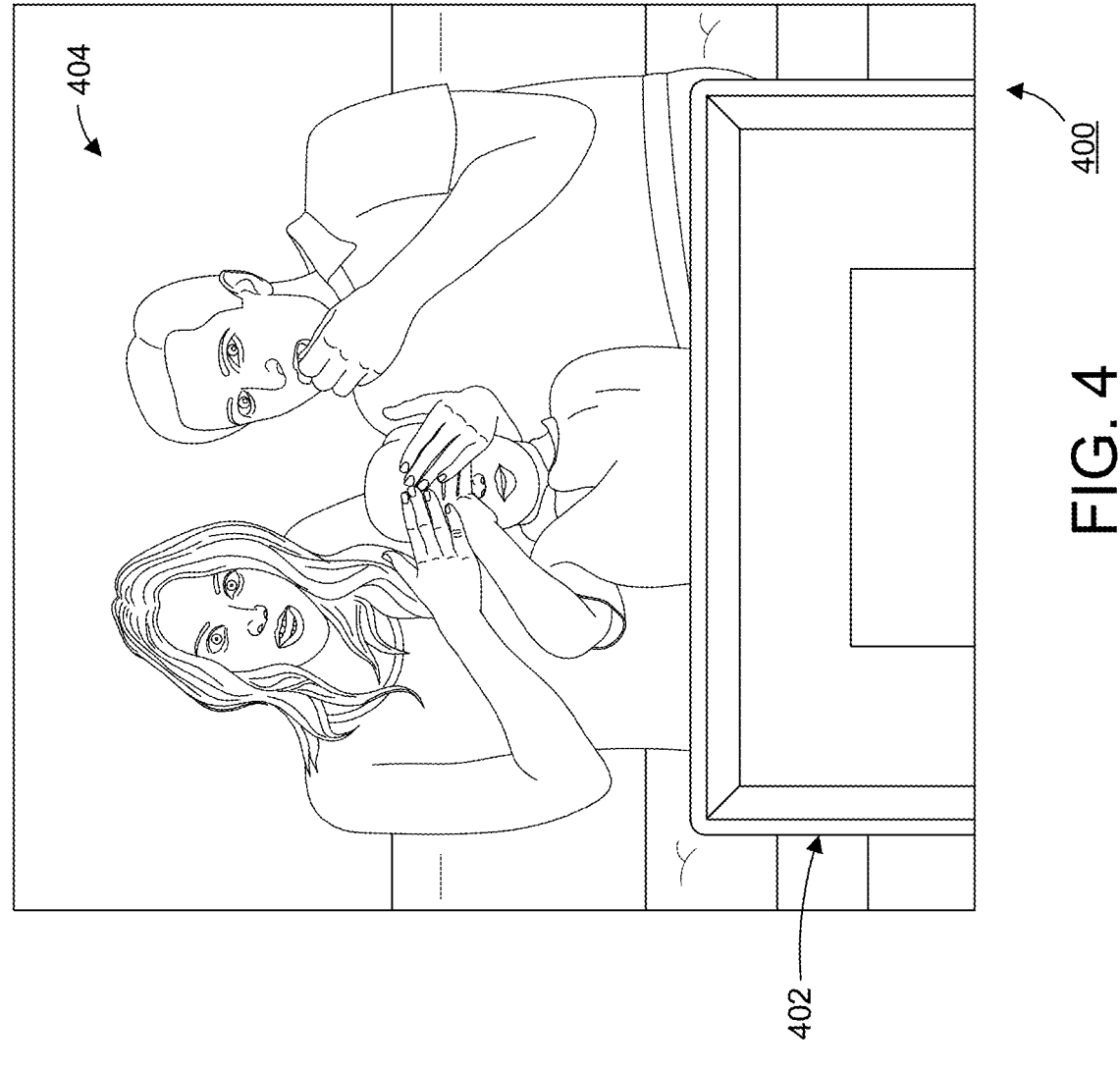
FIG. 4 depicts an exemplary embodiment of performing a user gesture to trigger user-selectable options on an illustrative device, in accordance with some embodiments of the disclosure.
Figure 5A:
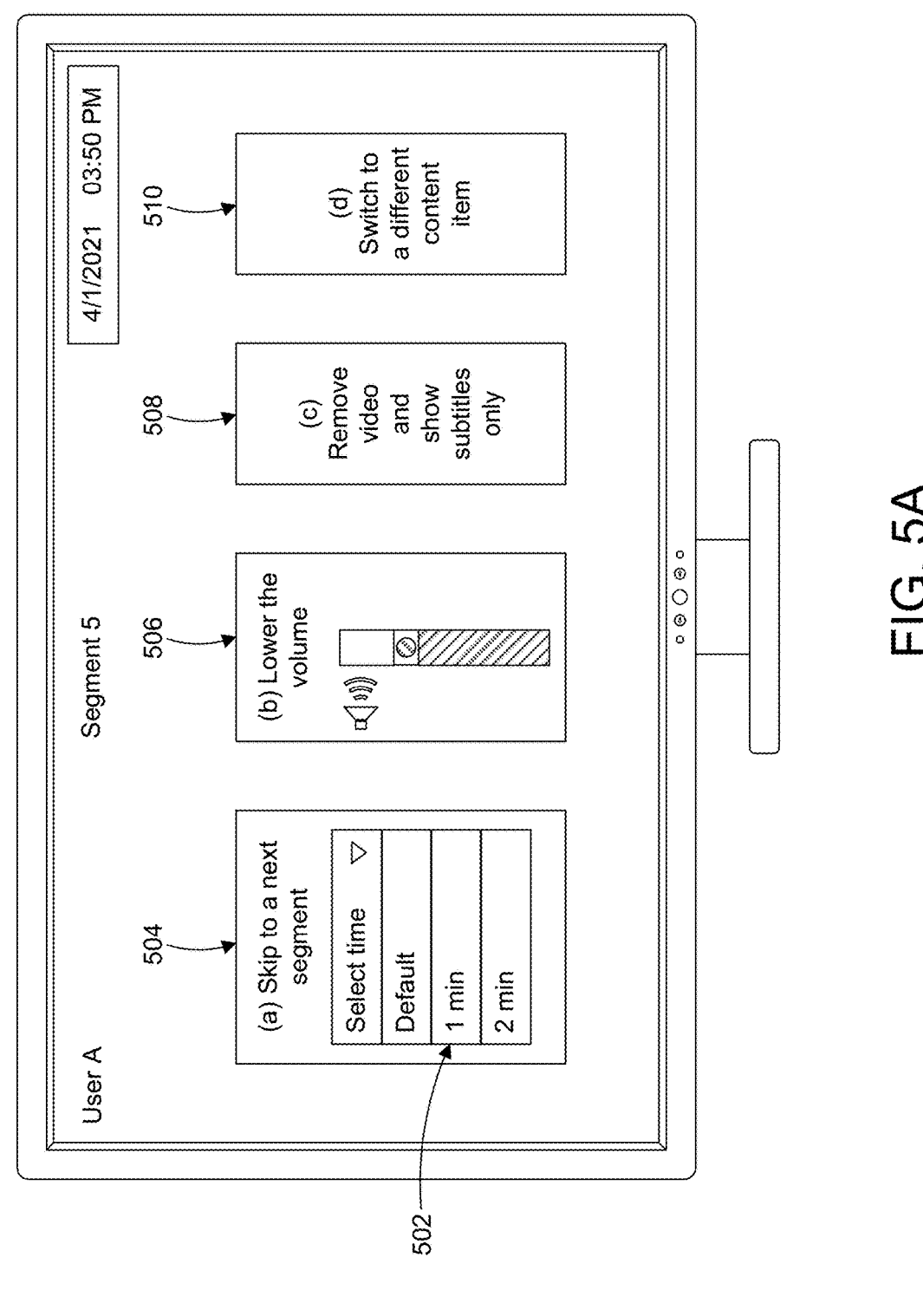
FIGS. 5A and 5B depict exemplary user interfaces for presenting user-selectable options for parental control of content items, in accordance with some embodiments of the disclosure.
Figure 5B:
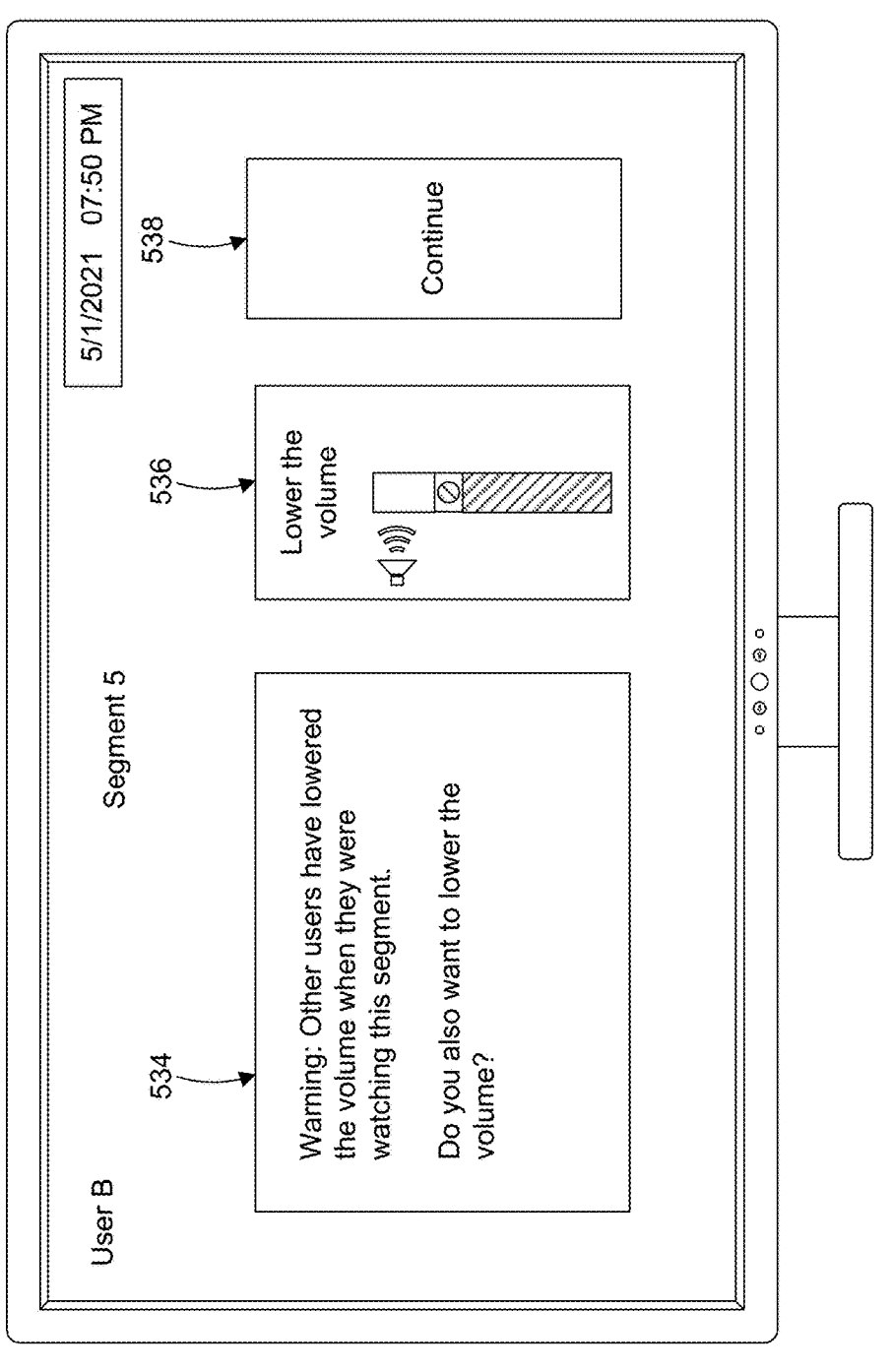

Having described system 100, reference is now made to FIG. 3, which depicts an example embodiment 300 for consuming a content item 302 displayed on the illustrative device 114 that may be implemented using system 100, in accordance with some embodiments of the disclosure. Reference is also made to FIG. 4, FIG. 5A, and FIG. 5B, which show example embodiment 400, exemplary user interface 500, and exemplary user interface 530 generated by system 100, in accordance with some embodiments. Although FIGS. 3-5B depict a user device (e.g., display device) as a television, it will be understood that any suitable device for displaying video content may be used, such as gaming equipment, user computer equipment, or a wireless user communications device discussed above in relation to FIG. 1.

A media application implemented on computing device 114 may be configured to request a content item from a server for display. The content item includes a group of sequential segments. Each segment consists of one or more frames. In some embodiments, a frame is one of the many still images. It will be understood that, consistent with the present disclosure, any content item may be requested for streaming or downloading from server 104 or a video-hosting web server.

As referred to herein, the term "content item" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

When a user requests presentation of a content item (e.g., "movie") on computing device (e.g., TV or laptop) 114 via the media application implemented on device 114, the media application requests the content item from a video-hosting web server or server 104. In response to the request, the server sends metadata of the content item. The metadata contains information about sequential segments of the content item, for example, timing of each segment, genre information, parental guidance rating, or intensity level for each segment.

As shown in exemplary embodiment 300, a family 304 (e.g., parents and a child) is watching content item 302 on TV. While family 304 is watching content item 302 together, if any violent content (e.g., zombie scene) that the parents think inappropriate for the child is displayed, the parents may perform a specific action to trigger parental control.

As shown in exemplary embodiment 400 in FIG. 4, parents 404 may put their hands over the child's eyes to ensure that the child does not watch the violent portion of the content item 402. There may be more than one triggering action, such as the parents 404 covering their own eyes with their hands (self-blocking) for over a threshold amount of time (e.g., two seconds) or the minor users may cover their eyes with their hands for over a threshold amount of time. Any of these actions or gestures may trigger temporary content restriction. Although the above-listed actions are used as exemplary triggering actions, any user-defined or system-defined gesture may be used to trigger content restriction.

A user gesture may be detected using any gesture detection techniques, such as any multimodal machine learning algorithms and models, to process perceptual data to different modalities, such as video or audio. Camera 224 implemented on computing device 114 may be used to capture an image or video of the user performing an action, and the gesture detection techniques may be used to analyze the image data to determine an action performed by the user.

In some embodiments, the media application determines the age of the user. For example, the media application may retrieve user age information from user profile data associated with the device. The media application may use user credentials or user data that have been received (e.g., parents users setting parental control for a child user). The media application also may determine the user's age based on the visual features of the user detected via the sensors implemented on the device using one or more age-profiling techniques. Based on the determined age, the system identifies which user performs the triggering gesture.

When such a gesture is performed by the user, the media application triggers the temporary restriction to the content item and presents user-selectable options for display. As shown in example user interface 500 of FIG. 5A, the user-selectable options include: (a) skipping a portion of the content item 504; (b) lowering the volume 506; (c) removing the video of the content item and showing subtitles only 508; or (d) switching to another content item 510. The list is not an exclusive list and may include other options that can obstruct the presentation of the portion of the content item. When a user selects one of the selectable options, the media application performs an action corresponding to the selection.

If option (a) is selected, then the media application skips a portion of the content item such that a segment that is deemed inappropriate is entirely skipped, and a subsequent segment of the content item is presented for display. A skipping amount may be determined by the media application based on the metadata of the content item. The media application may determine which segment (e.g., a portion of the content item) is inappropriate based on one or more metadata tags associated with a content item. For example, if the media application determines that only segment 5 includes inappropriate content based on the metadata tags (e.g., R-rated), then only segment 5 may be skipped and segment 6 will be presented. If the media application determines that both segment 5 and segment 6 include inappropriate content (e.g., genre information and intensity level), then both segment 5 and segment 6 may be skipped and segment 7 will be presented.

In some embodiments, the media application determines a default skipping amount based on the user's past history or patterns. For example, the default value may be determined based on a user profile or a type of content item (e.g., the period of the segment). These are exemplary factors that may be used to determine the default skipping amount, but any suitable factors may be used to determine the skipping amount. In some embodiments, a segment that is deemed inappropriate is fast-forwarded at a predetermined speed. Once the portion of the content item that is deemed inappropriate is passed, the subsequent segment may be played at a normal speed.

Within option (a), the media application may display a drop-down menu that offers a pre-populated list of values. In one embodiment, the drop-down menu can be optional (e.g., it may not be displayed unless requested by the user). The pre-populated values may include a list of time period values from which the user can choose. In some embodiments, the user can also enter any value that is not displayed in the list. If the user selects "1 min," then the media application skips the content item by 1 minute by either fast-forwarding or entirely skipping a corresponding segment.

If option (b) is selected, then the volume of the content item is lowered, so the minor user does not hear the audio of the content item while the video of the content item may still be presented for display. For example, if swear words are used in the content item and the parent user does not want the minor user to listen to the swear words, then option (b) may be selected. Because only the audio is suppressed, the video of the content item is still presented for display. Once the portion that is deemed inappropriate is passed, the volume of the content item is increased back to the previously set level.

If option (c) is selected, then the system removes the video of the content item. For example, if the content includes brutal scenes that the parents do not want the child to watch, then option (c) may be selected. When option (c) is selected, the entirety of the video may be removed such that a blank frame may appear. The blank frame may include a warning sign indicating that the content is being restricted. In some embodiments, only a portion of a frame that is deemed inappropriate may be removed (e.g., certain portions of the frame that includes blood). Any content manipulation techniques, such as blurring, masking, or pixelating, may be used. In some embodiments, if option (c) is selected, the system presents only closed caption or subtitles associated with the content item. Thereby, the visual aspect of the video is removed from the content item, and the child can only read the subtitles or closed caption to understand the context of the content item. If there is no closed caption or subtitles associated with the content item, then only the blank frame may appear on the display.

If option (d) is selected, then the media application presents another content item instead of presenting the currently displayed content item. The media application identifies a set of candidate content items that have similar attributes to the currently displayed content item based on metadata of the content item. For example, if a user is watching a romance movie, then another romance movie that is in the same genre as the currently displayed content item may be selected based on comparing the metadata of the currently displayed content item and the candidate content item. In some embodiments, a content item is selected based on the user profile data. For example, if a user indicates preferences for certain actors, a content item starring a preferred actor may be selected based on the user profile data. The alternative content item may include content that is suitable for a general audience (e.g., family movie).

In some embodiments, the media application stores options previously selected by the user as user preference data in a database and displays a pop-up message identifying a previously selected options via a graphical user interface. For example, upon detecting the triggering user gesture, the media application may present the pop-up message prompting the user to select the previously selected options. For example, the pop-up message may include, "You previously lowered the volume: do you want to enable this option?"

FIG. 5B depicts exemplary user interface 530 for providing user-selectable options for another user, in accordance with some embodiments of the disclosure. As shown in FIG. 3, user A may be watching a content item and performs a triggering gesture when an unappealing scene 302 is displayed. In response to detecting the triggering gesture, user-selectable options are presented to user A as shown in FIG. 5A. User A selects option (b): lowering the volume option 506. The media application identifies a segment at which the triggering gesture was performed by user A (e.g., segment 5) and generates a metadata tag for the identified segment. The metadata tag includes a segment identifier (e.g., segment 5) and a selected option (e.g., lowering the volume). The metadata tag may be stored in content item source 106 or user data source 108, such as cloud storage remote from user A's location.

At a later time, user B requests to generate the same content for display at user B's home, remote from user A's home. A media application installed on user B's device retrieves the content item and the metadata associated with the content item from the database of content items, such as content item source 106 or user data source 108. The metadata of the content item includes a metadata tag associated with the content item identifying a segment identifier (e.g., segment 5) and selected option (e.g., lowering the volume). The content item is generated for display on user B's device starting from segment 1. When the playback of the content item arrives at segment 5 (at which that the triggering gesture was performed by user A), the media application presents exemplary user interface 530. Exemplary user interface 530 may be presented before presenting segment 5 for display and without detecting a triggering gesture from user B. This way, user B can completely restrict the inappropriate content viewable by the child even before the inappropriate content is being generated for display.

In some embodiments, exemplary user interface 530 includes a pop-up message 534 "Other users have lowered the volume when they were watching this segment. Do you also want to lower the volume?" The pop-up message 534 may be presented with a selectable option 536 identified in the pop-up message 534. Selectable option 536 may be an option that was selected the most by the other users. This may indicate that the segment 5 includes sound that is not appealing (e.g., including swear words) but the scene is not very harmful. User B can select either user-selectable option 536 to lower the volume or select a continue option 538. When lower the volume option 536 is selected, the volume will be lowered until segment 5 is over. When continue option 538 is selected, then segment 5 will be played with the original volume.

In some embodiments, exemplary user interface 530 includes all the available selectable options for a user input similar to FIG. 5A, so user B may select a preferred option. The option may comprise: (a) skipping a portion of the first content item; (b) lowering the volume; (c) removing the video of the first content item and showing subtitle only; or (d) presenting a second content item different from the first content item for display.

FIG. 6 depicts a flowchart of a process 600 for providing gesture-based parental control, in accordance with some embodiments of the disclosure. It should be noted that process 600 may be performed by control circuitry 202, 210 of FIG. 2 as instructed by a media application that may be performed on any device 114 of FIG. 2. In addition, one or more steps of process 600 may be incorporated into or combined with one or more embodiments (e.g., user interface 300 of FIG. 3, embodiment 400 of FIG. 4, user interface 500 of FIG. 5A, and user interface 530 of FIG. 5B). Process 600 may be performed in accordance with the components discussed in connection with FIGS. 1-2.

At step 602, control circuitry 210 generates for output a content item. The content item consists of one or more segments, where each segment is associated with one or more metadata tags identifying genre information, parental guidance ratings, and intensity level. At step 604, control circuitry 210 identifies a first user and a second user who are in proximity to the device using one or more sensors implemented on computing device 114. For instance, computing device 114 may use camera 224 to detect a user who is within a threshold distance from the device (e.g., TV) or may use speaker 218 to identify a user who is having a conversation with another user near computing device 114 while the content item is output for display.

At step 606, control circuitry 210 determines whether a triggering gesture is performed by the first user (e.g., mom). The triggering gesture may be covering the eyes of the second user (e.g., child). In some embodiments, control circuitry 210 determines whether the triggering gesture is performed by at least one of the identified users. For example, the triggering action may be performed by the first user or the second user. The triggering action may be covering the eyes of the first user or the second user, such as parents placing hands over the eyes of a child, parents covering their own eyes, or a child covering their own eyes. Camera 224 installed on computing device 114 captures a user movement in an image or video form and transmits the image data to control circuitry 210. Control circuitry 210 analyzes the image data using one or more gesture detection algorithms.

If control circuitry 210 determines that a triggering gesture is performed by the first user in proximity to the device 114, control circuitry 210 presents user-selectable options for display at step 608. In some embodiments, control circuitry 210 determines whether the triggering action is performed by at least one of the users in proximity to the device. The user-selectable options include: (a) skipping a portion of the content item; (b) lowering the volume; (c) removing the video of the content item and presenting only the subtitles; or (d) presenting another content item. The list is not an exclusive list and may include other options that can obstruct the presentation of the portion of the content item. Control circuitry determines whether any of the options is selected at step 610. When a user selects one of the selectable options, control circuitry 210 performs an action corresponding to the selection.

If option (a) is selected, at step 612, control circuitry 210 skips a portion of the content item by fast-forwarding or entirely skipping a corresponding segment. If option (b) is selected, at step 614, control circuitry 210 lowers the volume of the content item. If option (c) is selected, at step 616, control circuitry 210 removes the video of the content item or displays only subtitles associated with the content item, if any. If there is no subtitles associated with the content item, then the subtitles are not displayed and the video is removed. If option (d) is selected, at step 618, control circuitry 210 presents another content item instead of presenting the current content item.

If control circuitry 210 determines that the triggering gesture is not performed, then control circuitry 210 does not present user-selectable options and continues to present the content item at step 620.

FIG. 7 depicts a block diagram of exemplary metadata 700, including genre information, parental guidance ratings, and intensity level for each segment, in accordance with some embodiments of the disclosure. Each segment (or frame) may be associated with one or more metadata tags representing various piece of information about the segment. As shown in exemplary metadata 700, frame 1 is associated with a genre tag (e.g., comedy), parental guidance rating tag (e.g., G-rated), and intensity level tag (e.g., intensity level 1). The metadata may be provided by a content item provider and may be retrieved from a remote source. For example, the genre information and the parental guidance rating may already be determined by the content provider and included in the metadata. Genre information indicates a specific genre of a segment (e.g., horror). The parental guidance rating indicates a classification of a segment set by the industry or organization.

An intensity level is a learned user-specific score based on user behavior. An intensity level represents a personalized rating that is calculated based on the user interaction with the content items. In some embodiments, an intensity level may not be consistent with the parental guidance ratings. To calculate an intensity level for each segment, the system may use one or more machine learning algorithms. The media application monitors user viewing history and identifies at which point a triggering action was performed. An intensity level may be trained based on previous user interactions with various content items and updated in real time. Based on the viewing history and timing information, the media application calculates an intensity level for each segment. The metadata tags, either alone or in combination with one or more tags, may be used to determine whether a certain segment is inappropriate.

In some embodiments, information about an intensity level may be used for another user that shares similar attributes. Based on the interactions with content items and preference, the media application determines that user A and user B would likely react similarly to a certain segment. Based on the similar attributes and similar user behavior patterns, the intensity level information of user A is fed into the metadata of the content item when user B requests the same content item. The media application may fetch the metadata of the content item that includes intensity level information for user A from a database and determine an intensity level for each segment for user B based on the intensity level information determined for user A. As a result, exemplary user interface 530 of FIG. 5B may be presented to user B when user B requests the same content item for display.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

capturing an image of a first user and a second user while the first user and the second user are consuming a first content item;

determining whether the captured image depicts the first user covering eyes of the second user;

after determining that the captured image depicts the first user covering the eyes of the second user, presenting in a user interface selectable options comprising at least two of (a) skipping a portion of the first content item, (b) reducing a volume for the first content item, or (c) censoring the first content item; and based at least in part on receiving, via the user interface, input selecting one of the selectable options, causing an action corresponding to the selectable option to be performed to the first content item.

2. The method of claim 1, further comprising retrieving user profile data to determine an age of the second user.

3. The method of claim 1, wherein determining whether the captured image depicts the first user covering the eyes of the second user comprises using gesture detection algorithms.

4. The method of claim 3, wherein the gesture detection algorithms comprise a machine learning algorithm.

5. The method of claim 1, wherein the selectable options are determined based at least in part on metadata associated with the first content item.

6. The method of claim 1, wherein presenting in the user interface selectable options further comprises presenting in the user interface an option to switch to a second content item.

7. The method of claim 1, further comprising storing user preferences based at least in part on receiving the input selecting one of the selectable options.

8. The method of claim 1, wherein determining an age of the second user comprises analyzing visual features of the second user.

9. The method of claim 1, wherein censoring the first content item comprises blurring, masking, or pixelating portions of the first content item.

10. The method of claim 1 further comprising detecting audio input to identify a change in presence of the first user or the second user.

11. A system comprising:

a sensor configured to:

capture an image of a first user and a second user while the first user and the second user are consuming a first content item;

control circuitry configured to:

determine whether the image captured by the sensor depicts the first user covering eyes of the second user;

after determining that the captured image depicts the first user covering the eyes of the second user, present in a user interface selectable options comprising at least two of (a) skipping a portion of the first content item, (b) reducing a volume for the first content item, or (c) censoring the first content item; and based at least in part on receiving, via the user interface, input selecting one of the selectable options, cause an action corresponding to the selectable option to be performed to the first content item.

12. The system of claim 11, wherein the control circuitry is further configured to further retrieve user profile data to determine an age of the second user.

13. The system of claim 11, wherein the control circuitry is configured to determine whether the captured image depicts the first user covering the eyes of the second user using gesture detection algorithms.

14. The system of claim 13, wherein the gesture detection algorithms comprise a machine learning algorithm.

15. The system of claim 11, wherein the selectable options are determined by the control circuitry based at least in part on metadata associated with the first content item.

16. The system of claim 11, wherein the control circuitry is configured to present in the user interface selectable options by further presenting in the user interface an option to switch to a second content item.

17. The system of claim 11, wherein the control circuitry is further configured to store user preferences based at least in part on receiving the input selecting one of the selectable options.

18. The system of claim 11, wherein the control circuitry is configured to determine an age of the second user by analyzing visual features of the second user.

19. The system of claim 11, wherein the control circuitry is configured to censor the first content item by blurring, masking, or pixelating portions of the first content item.

20. The system of claim 11, wherein the control circuitry is further configured to detect audio input to identify a change in presence of the first user or the second user.

* * * * *